United States Patent Office 3,644,383
Patented Feb. 22, 1972

3,644,383
MANUFACTURE OF 1,1'-DISUBSTITUTED-4,4'- (OR -2,2'-) BIPYRIDYLIUM SALTS FROM 1,1'-DISUBSTITUTED TETRAHYDROBYPYRIDYLS
John Gerard Carey and John Edward Colchester, Runcorn, England, assignors to Imperial Chemical Industries Limited, London, England
No Drawing. Filed Mar. 27, 1969, Ser. No. 811,250
Claims priority, application Great Britain, May 29, 1968, 25,774/68
Int. Cl. C07d 31/42
U.S. Cl. 260—295 AM    12 Claims

ABSTRACT OF THE DISCLOSURE

A process for the manufacture of 1,1'-disubstituted-4,4'- (or -2,2'-) bipyridylium salts which comprises reacting the corresponding 1,1'-disubstituted tetrahydrobipyridyl with an inorganic oxyacid anhydride which is capable of accepting hydrogen ions and has a redox potential in water more positive than −1.48 volts as compared with the saturated calomel electrode.

---

This invention relates to the manufacture of bipyridylium salts and related compounds and particularly to a process for the manufacture of quaternary salts of 1,1'-disubstituted - 4,4' - bipyridyls and 1,1' - disubstituted-2,2' - bipyridyls, which quaternary salts are useful herbicides.

According to the present invention there is provided a process for the manufacture of 1,1' - disubstituted-4,4'- (or -2,2'-) bipyridylium salts which comprises reacting the corresponding 1,1' - disubstituted-tetrahydro-4,4'- (or -2,2'-) bipyridyl with an inorganic oxyacid anhydride which is capable of accepting hydrogen ions from the tetrahydrobipyridyl, and has a redox potential in water more positive than −1.48 volts as compared with the saturated calomel electrode.

Any inorganic oxyacid anhydride may be used although we prefer to use an oxide of sulphur, carbon or nitrogen, for example sulphur dioxide, selenium dioxide, nitrogen dioxide and carbon dioxide. Sulphur dioxide is the preferred anhydride. The anhydride can be added as such or alternatively a compound may be added which gives rise to the anhydride under the conditions of the reaction, for example a bisulphite or a nitrite. We have found that by using sulphur dioxide as the oxidising agent a high reaction efficiency, for example 75% and high yields, for example 85% can be achieved.

If the anhydride is preformed, it may be employed in the gaseous phase, for instance by bubbling it through the tetrahydrobipyridyl or through a solution of the tetrahydrobipyridyl, but it is preferably employed in the liquid phase for example as the liquid anhydride or as a solution in an appropriate solvent. This may necessitate the use of low temperatures, for example as low as −50° C., and superatmospheric pressure depending upon the particular anhydride used; for instance use of liquid carbon dioxide necessitates lower temperatures and/or higher pressures than are required when using liquid sulphur dioxide.

Tetrahydrobipyridyls which may conveniently be converted to bipyridylium quaternary salts by our process include those more fully described in U.K. patent specification No. 1,073,081, for example tetrahydro-4,4'-bipyridyls which carry alkyl or carbamidoalkyl, and particularly methyl or N,N-disubstituted carbamidomethyl substituents on the nitrogen atoms. Other suitable 1,1'-disubstituted-tetrahydro-4,4'-bipyridyls are those carrying inert substituents, for example alkyl groups, on the carbon atoms of the pyridine nuclei. Tetrahydro-2,2'-bipyridyls may also be employed in the process of our invention. The tetrahydro-2,2'-bipyridyls may, like the tetrahydro - 4,4' - bipyridyls contain alkyl or carbamidoalkyl substituents on the N-atoms, or they may contain an N,N'-substituent which is a divalent organic radical, particularly an alkene and especially an ethylene radical, for example N,N'-ethylene tetrahydro-2,2'-bipyridyl.

The tetrahydrobipyridyl and the inorganic oxyacid anhydride can be interacted simply by mixing them but it is preferred to carry out the reaction in solution in an inert solvent for the tetrahydrobipyridyl and for the resulting bipyridylium salt. Examples of suitable solvents are ethers and thioethers for example diethyl ether, tetrahydrofuran, 1,2 - dimethoxyethane, bis-(2 - methoxyethyl) ether, 1,4 - dioxane and thiophene; ketones, for example acetone; hydrocarbons, for example benzene, toluene, xylene and hexane; organic bases, for example pyridine; halogenated hydrocarbons and particularly chlorinated hydrocarbons, for example chlorobenzene, chloroform, carbon tetrachloride and methylene dichloride; amides, particularly tertiary alkylamides, for example dimethyl formamide; sulphoxides, for example dimethyl sulphoxide; sulphones, for example sulpholane; nitriles, for example acetonitrile; alcohols, for example ethanol; nitro-compounds, for example nitropropane; and alkyl carbonates and sulphates, for example propylene carbonate and dimethyl sulphate. Alternatively the liquid anhydride for example liquid sulphur dioxide may itself act as the solvent.

The concentration of the tetrahydrobipyridyl when a solvent is present may conveniently be about 0.01 mole per litre, say 0.005 to 0.025 mole per litre and the concentration of the oxyacid anhydride may be conveniently about 0.1 to 20 gms. per 100 mls. of the reaction mixture. Of course, a very large excess of the anhydride may be present, as for example when the liquid anhydride is used as the solvent for the tetrahydrobipyridyl.

The temperature at which the reaction is carried out will depend upon the concentration of the reagents and on the particular reagents and solvent used. We have found that suitable temperatures are from about −50° C. to 150° C., preferably from −20° C. to 80° C.; room temperature can be used. Temperatures higher than 150° C. tend to cause decomposition of the tetrahydrobipyridyl. The most suitable time of reaction can be found by simple experiment.

The 1,1'-disubstituted bipyridylium salt may be recovered from the reaction mixture by conventional processes for example by extraction of the reaction mixture with water. The product, however, may be a solid which can be recovered by filtration. Other bipyridylium salts can be prepared by treatment of the product with a dilute aqueous solution of an acid such as sulphuric, hydrochloric, phosphoric or acetic acid. The bipyridylium salt may then be recovered from the aqueous phase, which has previously been separated from the organic phase, by evaporation of the water and crystallisation of the salt.

N-substituted pyridinium salts are often obtained as by-products of the process and these can be separated from the desired bipyridylium salts and used for preparing the tetrahydrobipyridyl starting material. Suitable processes for effecting the separation are described in U.K. patent specifications Nos. 1,084,868; 1,074,977 and 1,073,824.

The invention is illustrated but in no way limited by the following examples.

EXAMPLE 1

A solution of sulphur dioxide (50 mls.) in acetonitrile (50 mls.) was added dropwise to a solution of 1,1'-dimethyl-1,1',4,4'-tetrahydro-4,4'-bipyridyl (2.8 gms.) in acetonitrile (100 mls.) at —10° C. After a period of 2 hours from the final addition, the mixture was heated to cause removal by evaporation of any unreacted sulphur dioxide, and the resulting mixture was then filtered. The solid so obtained was dried in air, and was found to consist of 1,1'-dimethyl bipyridylium salt and quaternary methyl pyridinium salt. The reaction efficiency in respect of the bipyridylium salt was 75.6%, and in respect of the pyridinium salt it was 12.7% based on the tetrahydrobipyridyl fed.

EXAMPLE 2

A solution of 1,1' - dimethyl - 1,1',4,4' - tetrahydro-4,4'-bipyridyl (2.8 gms.) in benzene (50 mls.) was added dropwise to a solution of sulphur dioxide (7 gms.) in pyridine (100 mls.) at 0° C. After 4 hours from the final addition water was added and the resulting aqueous phase was separated and analysed polarographically and spectrophotometrically. The analysis showed that the products were 1,1'-dimethyl bipyridylium salt and N-methyl pyridinium salt. The reaction efficiencies were 72.3% and 9% respectively based on tetrahydrobipyridyl fed.

EXAMPLE 3

The procedure of Example 2 was repeated, except that 1-nitropropane (100 mls.) was used instead of pyridine as solvent for the sulphur dioxide.

The reaction efficiency in respect of the bipyridylium salt was 73.5% based on tetrahydrobipyridyl fed.

EXAMPLE 4

The procedure of Example 2 was repeated using propylene carbonate (100 mls.) as solvent for the sulphur dioxide instead of pyridine. The reaction efficiency in respect of the bipyridylium salt was 63.7% based on tetrahydrobipyridyl fed.

EXAMPLE 5

The procedure of Example 2 was repeated but using 1,1' - ethylene - 1,1',2,2' - tetrahydro - 2,2' - bipyridyl instead of 1,1' - dimethyl - 1,1,4,4' - tetrahydro - 4,4'-bipyridyl and allowing a reaction time of 1 hour instead of 4 hours. The product mixture was analysed spectrophotometrically. The reaction effiiciency was 40% in respect of the quaternary 2,2'-bipyridylium salt based on tetrahydrobipyridyl fed.

What we claim is:

1. A process for the manufacture of a water-soluble 1,1'-disubstituted-4,4'- or 2,2'-bipyridylium salt which consists of contacting at a temperature of from —50° C. to 150° C., the corresponding 1,1'-disubstituted tetrahydrobipyridyl with an inorganic oxyacid anhydride which is capable of accepting hydrogen ions and has a redox potential in water more positive than —1.48 volts as compared with the saturated calomel electrode and selected from the group consisting of oxides of sulphur, selenium, carbon and nitrogen, the 1,1'-disubstitution being selected from the group consisting of lower alkyl and carbamidoalkyl of the formula —$CH_2$—$CONR_2R_3$ wherein $R_2$ and $R_3$ are lower alkyl or when taken together with the attached N atom form piperidino or morpholino and where the said disubstitution also includes ethylene in the case of the said 1,1'-disubstituted 2,2'-bipyridylium salt.

2. A process as claimed in claim 1 wherein the reaction is carried out in the presence of an inert solvent for the tetrahydrobipyridyl.

3. A process as claimed in claim 2 wherein a water-immiscible solvent is employed.

4. A process as claimed in claim 1 wherein the temperature is from —20° C. to 80° C.

5. A process as claimed in claim 2 wherein a solvent is present and the concentration of the tetrahydrobipyridyl is from 0.05 to 0.15 mole per litre.

6. A process as claimed in claim 5 wherein the concentration of the inorganic oxyacid in hydride is from 0.1 to 20 gms. per 100 mils. of the reaction mixture.

7. A process as claimed in claim 1 wherein there is employed a compound which gives rise to the inorganic oxyacid anhydride under the conditions of the reaction.

8. A process as claimed in claim 1 wherein there is employed a solution of the inorganic oxyacid anhydride.

9. A process as claimed in claim 1 wherein the inorganic oxyacid anhydride is sulphur dioxide.

10. A process as claimed in claim 1 wherein the 1,1'-substituents of the tetrahydrobipyridyl are lower alkyl groups.

11. A process as claimed in claim 10 wherein the alkyl groups are methyl groups.

12. A process as claimed in claim 1 wherein the 1,1'-substituents of the tetrahydrobipyridyl are carbamido-lower-alkyl groups.

References Cited

UNITED STATES PATENTS 3,405,135   10/1968   Colchester et al. _____ 260—295

ALAN L. ROTMAN, Primary Examiner

U.S. Cl. X.R.

260—247.2 A, 268 Tr, 294 A, 296 D